United States Patent
Hahm et al.

(10) Patent No.: US 7,792,138 B2
(45) Date of Patent: Sep. 7, 2010

(54) DISTRIBUTED OPPORTUNISTIC SCHEDULING IN IEEE 802.11 WIRELESS LOCATION AREA NETWORKS (WLANS)

(75) Inventors: Seong-il Hahm, Seoul (KR); Jong-won Lee, Pohang-si (KR); Chong-kwon Kim, Seoul (KR)

(73) Assignee: Seoul National University Foundation (KR)

( * ) Notice: Subject to any disclaimer, the term of this patent is extended or adjusted under 35 U.S.C. 154(b) by 1029 days.

(21) Appl. No.: 11/520,541

(22) Filed: Sep. 13, 2006

(65) Prior Publication Data
US 2008/0063106 A1    Mar. 13, 2008

(51) Int. Cl.
*H04J 3/02* (2006.01)
(52) U.S. Cl. ............................ 370/462; 370/338
(58) Field of Classification Search ............... 370/318, 370/338, 401, 445, 447, 448, 449, 462
See application file for complete search history.

(56) References Cited

U.S. PATENT DOCUMENTS

| | | | |
|---|---|---|---|
| 6,330,429 B1 * | 12/2001 | He | 455/67.11 |
| 7,379,447 B2 * | 5/2008 | Dunagan et al. | 370/350 |
| 7,406,320 B1 * | 7/2008 | Kumar et al. | 455/456.1 |
| 7,653,043 B2 * | 1/2010 | Sakoda | 370/349 |
| 2005/0089005 A1 * | 4/2005 | Sakoda et al. | 370/348 |
| 2007/0002820 A1 * | 1/2007 | Xhafa | 370/348 |

* cited by examiner

*Primary Examiner*—Ricky Ngo
*Assistant Examiner*—Christine Ng
(74) *Attorney, Agent, or Firm*—Cantor Colburn LLP (57) ABSTRACT

A WLAN distributed/opportunistic scheduling (WDOS) method for acquiring a multi-user diversity gain is disclosed. The WDOS method allows a transmitter (i.e., a transmission user) to observe channel conditions of receivers (i.e., reception users), and commands the transmitter to transmit packets to a specific receiver having a relative good channel condition. The WDOS method uses a modified RTS/CTS exchange method to perform the channel probing. If the transmitter broadcasts the BRTS frame, each receiver transmits a CTS frame after the lapse of its backoff period. According to the reception signal strength distribution, the backoff delay time minimizes the number of CTS collisions irrespective of the number of receivers, reduces an amount of channel probing overheads, and maximizes a multi-user diversity gain. The better the relative channel condition, the lower the backoff delay time.

20 Claims, 11 Drawing Sheets

DISTRIBUTED OPPORTUNISTIC SCHEDULING IN IEEE 802.11 WIRELESS LOCATION AREA NETWORKS (WLANS)

BACKGROUND OF THE INVENTION

1. Field of the Invention

The present invention relates to a distributed/opportunistic scheduling method for acquiring a multi-user diversity gain in a wireless local area network (WLAN), and a more particularly to a distributed/opportunistic scheduling method for acquiring a multi-user diversity gain in a WLAN, which uses a multi-user diversity technique in a WLAN or Ad-hoc network environment to improve overall process efficiency of the WLAN or Ad-hoc network, thereby increasing throughput as well as fairly assigning a radio-channel access time to a plurality of receivers.

2. Description of the Related Art

WLANs (Wireless Local Area Networks), which provide flexible impromptu accesses to the Internet, have been widely deployed for the last several years.

The establishment of the IEEE 802.11 WLAN standard has propelled the explosive development and deployment of WLAN products. At the beginning, the IEEE WLAN standard started with 1 or 2 Mbps WLAN specifications. Later the standard body established the 802.11b technology that supports two supplementary data rates of 5.5 Mbps and 11 Mbps. WLAN technologies advanced further and 802.11a or 802.11g devices, which provide up to 54 Mbps data rate, have gained wide popularity in recent years. The IEEE 802.11 standard committee is currently working on the 802.11n specifications for transmission rates up to 600 Mbps.

Like many other modern wireless communication techniques, the IEEE 802.11 WLANs support the multi-rate capability by adopting rate-dependent modulation schemes and coding rates. Denser modulation schemes or higher coding rates increase data bits per symbol, but signals become more vulnerable to interference or noise. A sender should select appropriate transmission rates based on receiver's current channel condition. The selection of proper data rates is called rate adaptation and many rate adaptation algorithms have been proposed.

Automatic Rate Fallback (ARF) is implemented in many commercial wireless devices due to its simplicity. On the other hand, Receiver Based Auto Rate (RBAR) will be included in several standards such as IEEE 802.11n. Note that the rate adaptation problem optimizes the transmissions on a single time-varying wireless link.

Multiple time-varying wireless links provide the opportunities to further improve the performance of the systems. Each wireless link quality independently fluctuates both in a short-term scale (small-scale fading) and in a long-term scale (large-scale propagation). In this document, we focus on small-scale fading.

Rayleigh and Ricean distributions describe the time-varying characteristics of a small-scale flat fading signal in the outdoor and indoor environments, respectively. Suppose that a sender has packets to send to several receivers each of which experiences independent small-scale fading. Because we can adjust transmission rates based on receiver's channel quality, a sender may be able to improve its throughput by scheduling receivers which happened to be in good channel conditions. The scheduling algorithms, which exploit the dynamic fluctuation of receivers' channel qualities or multi-user diversity, are called opportunistic scheduling algorithms.

Information on receivers' channel states is essential for implementing opportunistic scheduling. In 1×EVDO, a Base Station (BS) adjusts transmission rates according to the channel conditions of the Mobile Hosts (MHs). The BS broadcasts a pilot signal periodically at full power, and each MH measures the Carrier to Interference ratio (C/I) of the pilot signal. This channel state information, in the form of a data rate, is reported to the BS via the Data Rate Control (DRC) channel every 1.67 ms. The requested data rate is the highest possible sending rate from the BS to the MH for the current channel condition. 1×EVDO adopts the Proportional Fair (PF) scheduler as a scheduling algorithm at BS. The PF scheduler guarantees temporal fairness using the relative channel quality as a criterion in selecting receivers. That is, the PF scheduler selects the MH with the largest value of $DRC_i(t)/R_i(t)$, where $R_i(t)$ is the average transmission rate and $DRC_i(t)$ is the requested data rate of user i at slot time t.

The PF scheduler updates $R_i(t)$ in each slot according to the following equation, $$R_i(t+1)=(1-1/t_c)R_i(t)+1/t_c*DRC_i(t)*\delta_i, \quad \text{[Equation 1]}$$

where the parameter $t_c$ is the time constant of a low pass filter. $\delta_i$ is set to 1 if user i is served at a time slot t, otherwise it is set to 0. It has been shown that PF scheduling realizes high channel efficiency while ensuring temporal fairness even if the station's channel quality statistics are unknown.

Let us examine the rate adaptation schemes proposed for WLANs. Two representative rate adaptation schemes have been proposed: ARF (Automatic Rate Fallback) and RBAR (Receiver Based Auto Rate).

With ARF, if two consecutive transmissions to a receiver fail, a sender reduces the transmission rate to the receiver by one level. On the other hand, the sender increases the rate to the next higher level in the case that ten consecutive transmissions to the receiver are all successful. That is, ARF adjusts data rates in a trial-and-error manner without explicit channel information. Certainly, we can perform more precise adjustments if the channel information is explicitly provided to the sender.

RBAR uses the RTS/CTS handshake for the delivery of channel information. Receiving an RTS from a sender, a receiver measures the signal quality of the RTS and informs the sender of the optimal data rate by specifying it in a CTS frame.

It is more complex to adopt opportunistic scheduling in WLANs than cellular network systems. As explained before, cellular network systems such as 1×EVDO have an intrinsic channel information report mechanism. The IEEE 802.11 WLANs do not support a mechanism that collects receiver channel information. We must first devise channel probing mechanism to employ opportunistic scheduling in WLANs.

In spite of the difficulty of collecting receivers' channel quality information, two opportunistic scheduling algorithms for WLANs have been proposed recently: MAD (Medium Access Diversity) and OSMA (Opportunistic packet Scheduling and Media Access control).

Both schemes employ the RTS (Request-to-Send)/CTS (Clear-to-Send) handshake with modifications for channel probing.

In MAD, a sender selects a few candidate receivers among all active receivers and multicasts an RTS frame to the selected receivers. The sender explicitly specifies the selected candidates by recording their addresses in the RTS frame. Each probed receiver reports its channel condition to the sender via a CTS frame. To avoid CTS collisions, the receivers transmit CTS frames according to the order specified in the RTS frame. Based on the reported channel information, the sender selects the most appropriate receiver based on various criteria. Let us examine the channel probing procedure of MAD. A sender, S, selects k candidates among N receivers and multicasts an RTS frame to the selected candidates. Assume that the ordering of candidate receivers be $R_1$, $R_2, \ldots, R_k$. The receivers transmit CTS frames in the specified order adding SIFS delays between two consecutive CTS frames. The number of probed candidates, k, is an important parameter that decides the multi-user diversity gains and the channel probing overheads of MAD. The overheads and the gains of MAD increase as k increases. An extensive sensitivity study showed that the optimal number is three.

OSMA is another opportunistic scheduling protocol designed for WLANs. Like MAD, a sender selects candidate receivers and transmits a channel probing message to the candidates. The differences are in the CTS response phase. While all selected candidates transmit CTS frames in MAD, only receivers whose channel qualities are better than a certain threshold reply with RTS frames after SIFS+(n−1)*SlotTime, where n is the priority of a receiver and SlotTime is one backoff slot time (i.e., 9 microseconds in IEEE 802.11a).

Another important difference is the early termination of the CTS response phase; the first CTS frame suppresses the following responses and terminates current channel probing. Again, we assume that k receivers, $R_1, R_2, \ldots, R_k$, are selected in that order. $R_1$, whose channel quality is lower than the threshold, keeps silent during its response period. $R_2$, with a good channel quality, transmits a CTS frame after SIFS+SlotTime. Upon detecting the $R_2$'s response, the remaining receivers, $R_3, \ldots, R_k$, give up their responses. The sender transmits a DATA frame to $R_2$ after SIFS. Two parameters, the number of candidate receivers and the threshold, interact in a rather subtle manner and determine the performance of OSMA. Wang and et. al. discovered that the adequate number of candidates is four.

SUMMARY OF THE INVENTION

Therefore, the present invention has been made in view of the above problems, and it is an object of the invention to provide a distributed/opportunistic scheduling method for acquiring a multi-user diversity gain in a wireless local area network (WLAN), which applies a WLAN Distributed Opportunistic Scheduling (WDOS) technique to all mobile nodes, and thus acquires a maximum multi-user diversity gain using the WDOS technique capable of transmitting a probing message to all mobile nodes, allowing only the best node from among the mobile nodes to answer the probing message, and maintaining the probing overhead of a predetermined level or lower regardless of the number of nodes to be probed.

In accordance with one aspect of the present invention, these objects are accomplished by providing a distributed/opportunistic scheduling method for acquiring a multi-user diversity gain in a wireless local area network (WLAN) including a transmitter for transmitting data and a plurality of receivers for receiving the data from the transmitter comprising the steps of: a) broadcasting, by the transmitter, a BRTS (Broadcast Request-to-Send) frame to all the receivers, and informing the receivers of a channel probing intention; b) measuring, by the receivers having received the BRTS frame, instantaneous reception signal strengths, and acquiring a probability density function of the measured instantaneous reception signal strengths from the measured instantaneous reception signal strengths and their average value; c) dividing the probability density function into a predetermined number of intervals; d) determining which one of the divided intervals includes a current reception signal strength, and calculating a backoff period according to the position of the determined interval; e) transmitting a CTS (Clear-to-Send) frame after the backoff period expires; and f) transmitting, by the transmitter, data frames to a specific receiver having firstly transmitted the CTS frame.

In accordance with another aspect of the present invention, there is provided a distributed/opportunistic scheduling method for acquiring a multi-user diversity gain in a wireless local area network (WLAN) including a transmitter for transmitting data and a plurality of receivers for receiving the data from the transmitter comprising the steps of: broadcasting, by the transmitter, a BRTS (Broadcast Request-to-Send) frame to all the receivers, and informing the receivers of a channel probing intention; b) measuring, by the receivers having received the BRTS frame, instantaneous reception signal strengths, and calculating a probability density function of the measured instantaneous reception signal strengths as an exponential distribution which is a function of an average of the measured instantaneous reception signal strengths; c) dividing the calculated exponential distribution function into a predetermined number of intervals; d) determining which one of the divided intervals includes a current reception signal strength, and calculating a backoff period according to the position of the determined interval; e) transmitting a CTS (Clear-to-Send) frame after the backoff period expires; and f) transmitting, by the transmitter, data frames to a specific receiver having firstly transmitted the CTS frame.

Preferably, the transmitter transmits data frames to the receiver having firstly transmitted the CTS frame at a transfer rate recorded in an R (Rate) field of the CTS frame.

Preferably, the transmitter broadcasts a BRTS (Broadcast Request-to-Send) frame which includes two additional fields in a general RTS frame used for the WLAN, the two additional fields including: an Add/Drop (A/D) field for managing a set of active receivers acting as the receivers to which the transmitter has pending data frames to deliver; and a Num Field for indicating the number of the active receivers.

Preferably, if the transmitter has data frames to send to a currently dormant receiver, the transmitter sets the A/D flag to "1", records an MAC address of a newly-activated receiver in an RA field, broadcasts the BRTS frame, and thus indicates that the receiver becomes the active receiver; and if there is no packet to be transmitted to the active receiver, the transmitter sets the A/D flag to "0", records an MAC address of the corresponding receiver in the RA field, broadcasts the BRTS frame, indicates that the corresponding receiver is a passive receiver, and commands the receiver not to participate in a CTS (Clear-to-Send) competition.

Preferably, if the BRTS frame has no WDOS control field capable of managing a set of active receivers acting as the receivers to which the transmitter has pending data frames to deliver, the transmitter uses an RA field as a bitmap field, such that it simultaneously indicates states of all the receivers.

Preferably, the receiver divides the exponential distribution into a predetermined number of intervals having the same area to assign the same probability to the intervals, selects a single interval of the highest signal strength from among the intervals, and displays the selected interval as a first interval.

Preferably, the receiver cancels the CTS frame if the backoff period is longer than a predetermined maximum backoff period ($B_{max}$), or cancels the CTS frame if it receives the CTS frame from another receiver before the backoff period expires, and the receiver records a maximum transfer rate at the BRTS reception signal strength in an R (Rate) field of the CTS frame, and transmits the CTS frame to the transmitter after the competitive time expires.

Preferably, the receiver, if the reception signal strength measured while receiving the BRTS frame belongs to an i-th interval of the probability density function, calculates the backoff period for transmitting the CTS frame using the following equation:

$$\text{Backoff} = ((i-1)*M + \text{rand}[0, \ldots, M-1])*\text{SlotTime}. \quad \text{[Equation]}$$

where SlotTime is a slot time of the WLAN, M is a constant of at least 2 to prevent consecutive CTS collisions from being generated, and rand[0, ..., M−1] is a function for selecting an arbitrary single number from among a plurality of numbers contained in a specific interval [ ].

The present invention uses a CTS response method based on a competitive method to acquire all possible multi-user diversity gains without generating excessive channel probing overheads in a WLAN system.

The transmitter (i.e., a transmission user) broadcasts a BRTS frame for channel probing to all active receivers.

In this case, the active receivers represent the receivers to which the transmitter has pending data frames to deliver.

Each active receiver waits for a random backoff period before transmitting the CTS frame.

The backoff period is determined according to a relative reception signal strength only. The backoff mechanism assigns a smaller backoff period to a specific receiver who has a superior channel condition.

If at least two active receivers have the same backoff period, a CTS collision occurs.

If a first CTS frame is transmitted irrespective of the CTS collision, a current channel probing procedure is terminated.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 1:
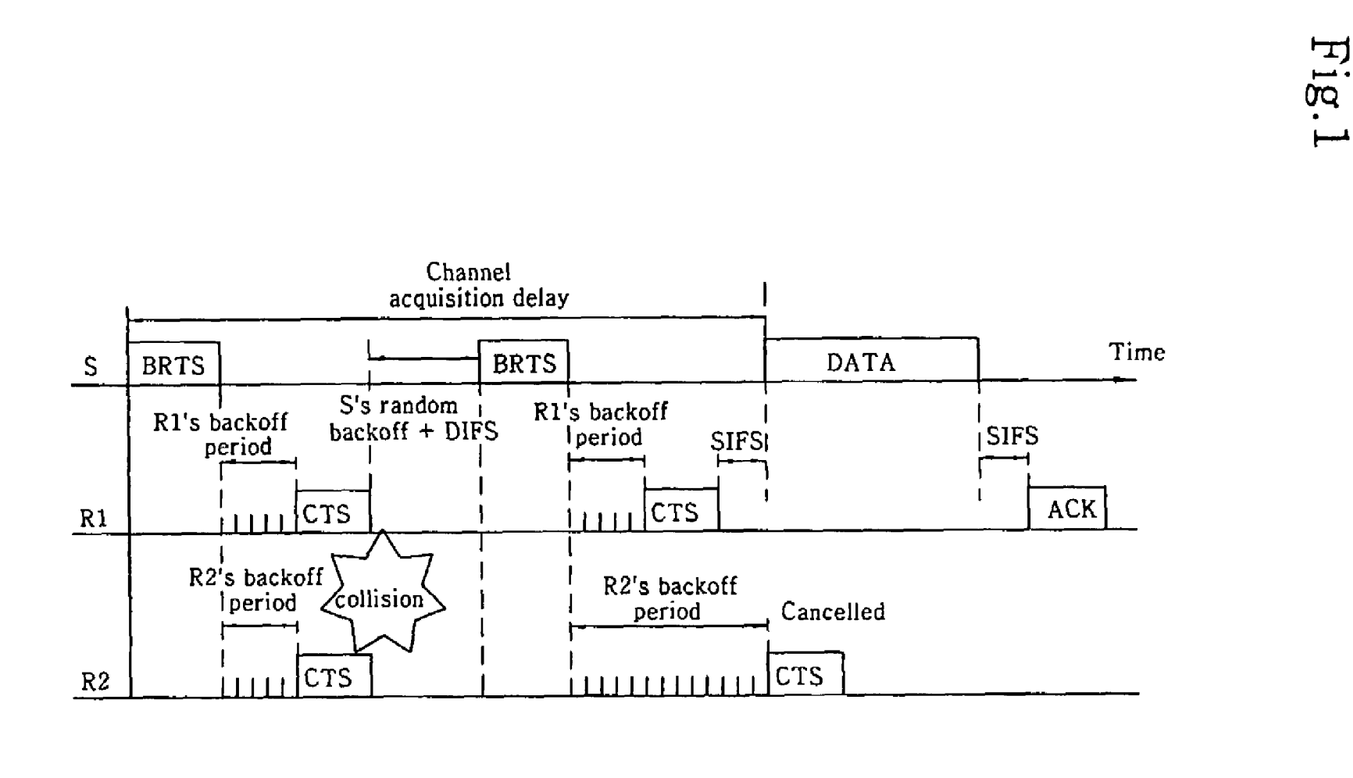
FIG. 1 is a conceptual diagram illustrating a channel probing process using a WLAN distributed/opportunistic scheduling (WDOS) method according to the present invention.

FIG. 1 is a conceptual diagram illustrating a channel probing process using a WLAN distributed/opportunistic scheduling (WDOS) method according to the present invention.

Referring to FIG. 1, a transmitter S firstly transmits a BRTS frame to probe channel states of two receivers R1 and R2.

In this case, the transmitter S may be indicative of an access point (AP) of a general WLAN system, or may also be indicative of any one of nodes of the same wireless terminal.

The receivers R1 and R2 determine their backoff periods on the basis of reception signal strengths of their measurement BRTS frames.

The receiver may also be indicative of a wireless terminal node connected to the access point (AP), or may also be indicative of any one of nodes of the same wireless terminal.

In this case, since the backoff time of the first receiver R1 is equal to that of the second receiver R2, the receivers R1 and R2 simultaneously transmit the CTS frame, resulting in the occurrence of CTS collision.

The transmitter S re-transmits the BRTS frame because there is no CTS frame within a predetermined period of time. Since the backoff time of the first receiver R1 is shorter than that of the second receiver R2, the first receiver R1 firstly transmits the CTS frame, and the second receiver R2 cancels its own CTS frame by listening to the CTS frame of the first receiver R1.

The transmitter S transmits data to the first receiver R1 having firstly transmitted the CTS frame.

A time from a first moment at which the transmitter S transmits the BRTS frame to a second moment at which the transmitter S successfully receives the CTS frame is called a channel acquisition delay time.

If the CTS collision occurs, the transmitter S must re-transmit the BRTS frame, and must receive a collision-free CTS frame, such that the channel acquisition delay time becomes longer.

In order to reduce an amount of the channel probing overheads, the channel acquisition delay time must be maintained at a low level, irrespective of the number of active receivers.

Figure 2:
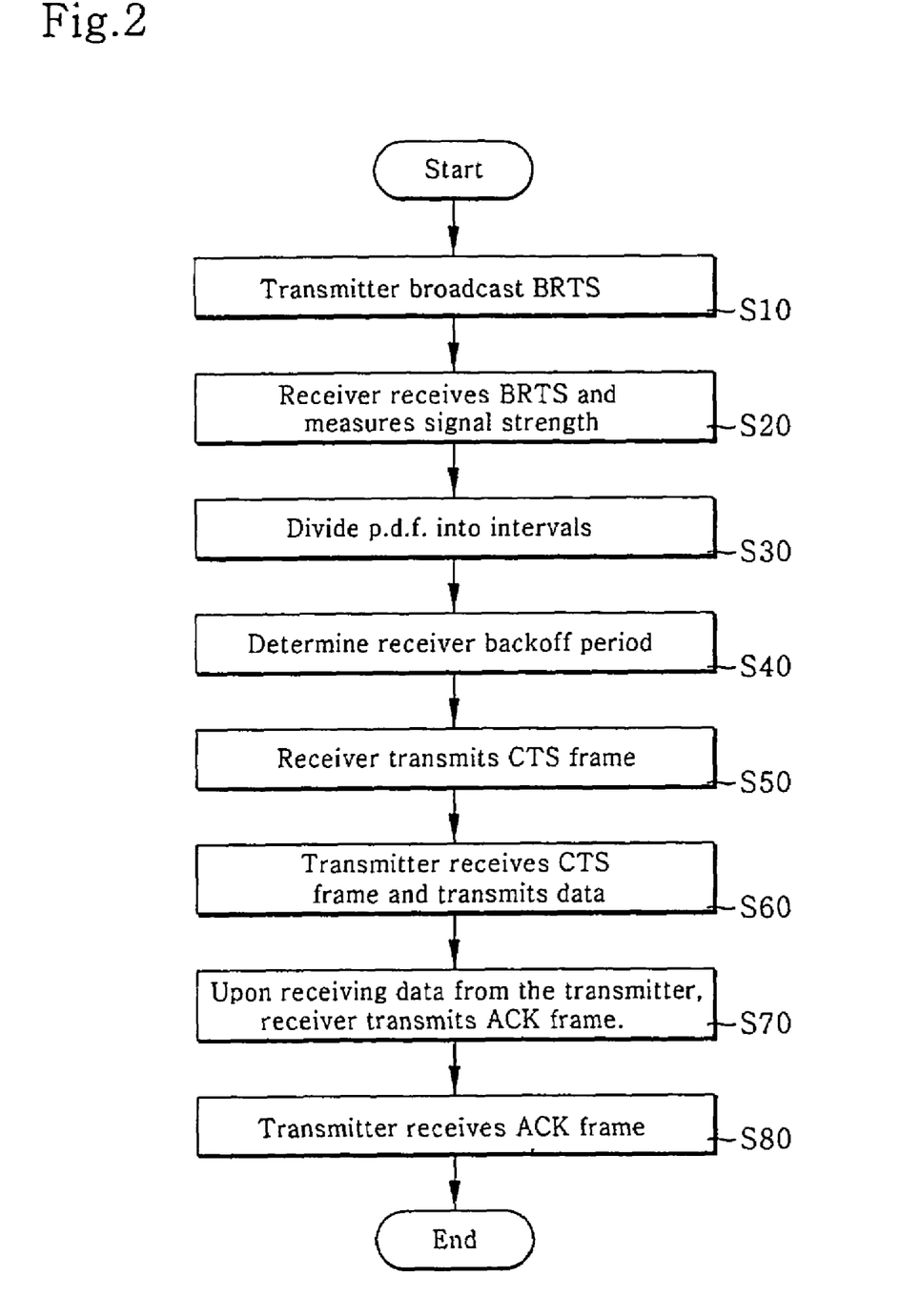
FIG. 2 is a flow chart illustrating a WDOS method for acquiring a multi-user diversity gain in a WLAN according to the present invention.

FIG. 2 is a flow chart illustrating a WDOS method for acquiring a multi-user diversity gain in a WLAN according to the present invention.

Referring to FIG. 2, a distributed/opportunistic scheduling method for acquiring a multi-user diversity gain in a wireless local area network (WLAN) including a transmitter for transmitting data and a plurality of receivers for receiving the data from the transmitter comprises the steps of: S10) transmitting, by the transmitter, a BRTS (Broadcast Request-to-Send) frame to all the receivers, and informing the receivers of a channel probing intention; S20) acquiring, by each of the receivers having received the BRTS frame, a probability density function of the measured instantaneous reception signal strengths as an exponential distribution which is a function of an average of the measured instantaneous reception signal strengths; S30) dividing the acquired exponential distribution into a predetermined number of intervals; S40) determining which one of the divided intervals includes a current reception signal strength, and calculating a backoff period according to the position of the determined interval; S50) transmitting a CTS (Clear-to-Send) frame after the lapse of the backoff period; S60) transmitting, by the transmitter, data frames to a specific receiver having firstly transmitted the CTS frame; S70) upon receiving the data frames from the transmitter, allowing each of the receivers to transmit an acknowledgement (ACK) frame; and S80) allowing the transmitter to receive the acknowledgement (ACK) frame from the receivers.

According to the above-mentioned distributed/opportunistic scheduling method for acquiring a multi-user diversity gain in the WLAN, if the transmitter transmits the BRTS frame to all the receivers at step S10, each receiver having received the BRTS frame measures the reception signal strength at step S20, acquires a probability density function (p.d.f) of the received signal strengths, divides the probability density function (p.d.f) into a predetermined number of intervals at step S30, and determines its own backoff time at step S40.

The receiver transmits the CTS frame after the lapse of the backoff period at step S50. If the transmitter successfully receives a collision-free CTS frame, the channel probing process is terminated. The transmitter transmits data to a specific receiver having firstly transmitted the CTS frame at step S60. Upon receiving the data from the transmitter, the receiver transmits an acknowledgement (ACK) frame at step S70. Finally, the transmitter receives the acknowledgement (ACK) frame from the receiver at step S80, such that the data transfer scheduled by the channel probing process is terminated.

The performance of WDOS is governed by the mechanism that selects the CTS backoff periods. The backoff mechanism must satisfy three requirements: i) full realization of multi-user diversity opportunities, ii) fairness, and iii) quick channel probing. The first can be easily accomplished by assigning shorter backoff delays to receivers with better received SNR. To determine a backoff time according to received SNR, each receiver needs a basis to compare its received SNR with. If we adopt an absolute basis, we have a difficulty to guarantee that receivers respond with the same access probability when they have different average channel conditions. To support long-term access fairness among receivers (the second requirement), we employ a probability density function (p.d.f.) of received SNR as a relative basis.

Figure 3:
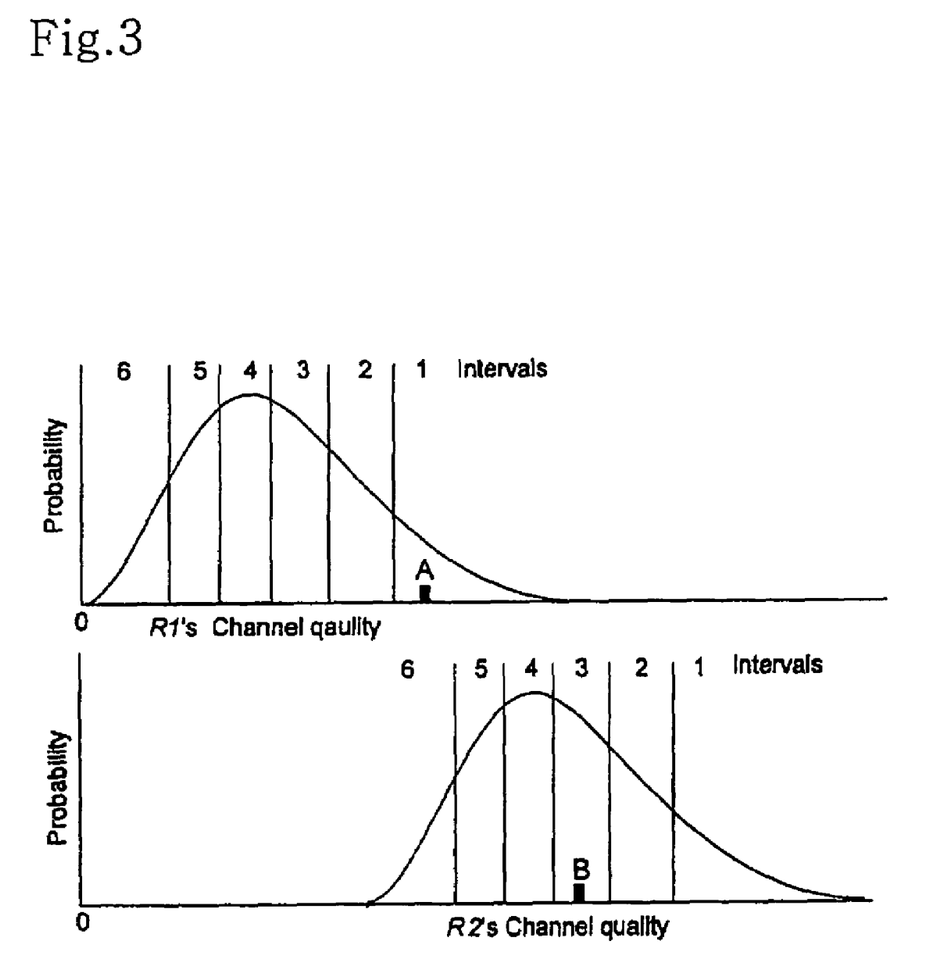
FIG. 3 exemplarily shows graphs illustrating a method for determining a backoff delay time using a probability density function of the reception signal strength according to the present invention.

Let us elaborate the backoff mechanism with an example. Even though WDOS works well in heterogeneous environments, for the sake of simplicity, we assume two receivers, R1 and R2, have independent and identical channel quality p.d.f. with different averages. Each p.d.f. is divided into a fixed number of intervals as shown in FIG. 3. Each p.d.f. interval has the same area, thereby having the same probability. A receiver in interval 1 transmits a CTS message immediately without an additional delay. More generally, a receiver in the i-th interval transmits a CTS message after additional i−1 backoff slots. Suppose R1 and R2 are in interval 1 (denoted by 'A') and in interval 3 (denoted by 'B'), respectively. Even though the absolute channel quality of R2 is better than that of R1, R1 grasps the channel because its relative channel quality is better than R2's. Such a backoff mechanism based on a channel quality p.d.f. enables receivers to fairly compete for channel resources because they belong to the i-th interval with the same probability regardless of average channel conditions. With the long-term access fairness, WDOS can provide each receiver with the same service time by assigning equal time per probing, thereby guaranteeing long-term temporal fairness.

WDOS inevitably suffers from collisions between response messages. As the number of receivers increases, the contention becomes heavier. To tackle this, the number of partitions, L, must be proportion to the number of receivers, N. Large values of L (i.e. fine grained partitions) command good multi-user diversity gains and reduce the chance of CTS collisions but delay the first CTS response. Small values of L (i.e. coarse grained partitions) exert the exactly opposite effects on the potential multi-user diversity gains, the collision possibility, and the responsiveness. The question is "Is the relation between L and N linear?" Our performance study, detailed in Section 5, indicates that the relationship is indeed linear.

Another concern is the continual CTS collisions; two or more receivers in the same relative channel position collide in each of consecutive channel probing periods if their relative channel positions persist. There are several methods that solve the problem. One is to add a random factor to the backoff delay and another is the BEB mechanism. For simplicity, WDOS adopts the former method. Each interval is further partitioned into M slots and the backoff delay of a receiver in the i-th interval is determined as $((i-1)*M+rand[0,\ldots,M-1])*SlotTime$, where SlotTime is one backoff slot time and $rand[0,\ldots,M-1]$ is a random integer selection function from 0 to M−1. Like L, a large M decreases the collision probability while increases the probing overheads. For the third requirement, subtle adjustments of parameters, L and M are needed.

WDOS supplies a fail-safe mechanism against abnormal operations. One abnormal condition is the failure of BRTS frame transmission due to collisions or sudden channel degradations. To prevent the sender from waiting for CTS for a prolonged time, WDOS specifies a parameter $B_{max}$ which is the maximum number of slots before the sender terminates the current probing period and starts a new one. We can set $B_{max}$ to a value much smaller than the theoretical limit, $L*M-1$, because the probability that all receivers are in poor channel conditions is small. More importantly, WDOS improves its performance by passing up the transmission to the receivers in poor channel qualities after long probing delays.

WDOS requires receivers to be informed of their active/inactive states. We use the BRTS frame for the receiver state management.

Figure 4A:
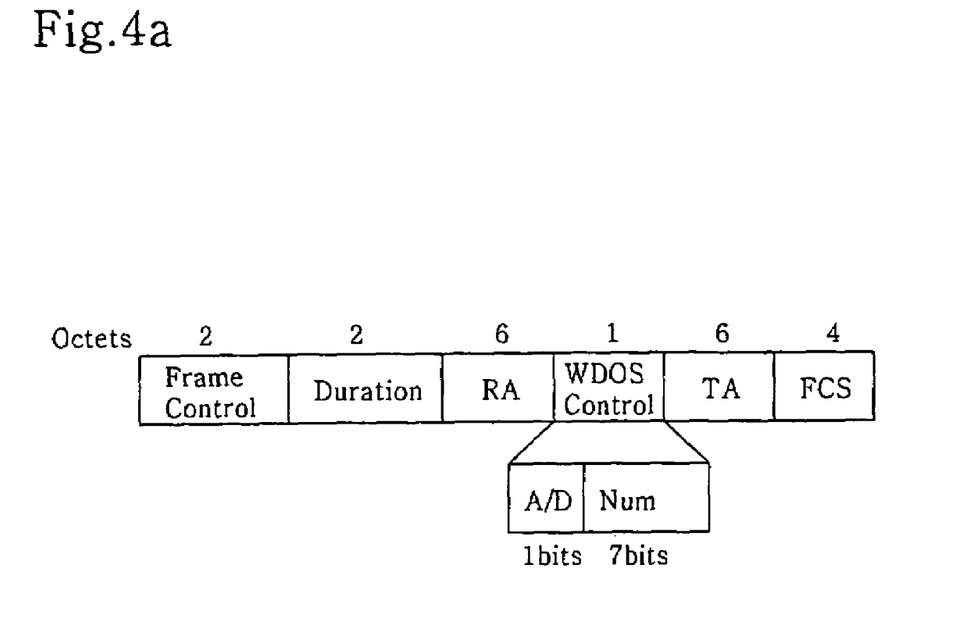
FIGS. 4A to 4B are structural diagrams illustrating BRTS (Broadcast RTS) and CTS frames, respectively, according to the present invention.

As shown in FIG. 4A, the BRTS control frame contains two additional fields, A/D (Add/Drop) and Num, for the receiver state management. A sender activates a currently dormant receiver by recording the receiver's address in the RA field and setting the A/D flag to '1'. Deactivation is more complex than activation and we develop two methods: explicit and implicit methods. The explicit method records the address of a deactivated node in the RA field and sets the A/D flag to '0'. The explicit method is usually used to subdue passive receivers that wrongly think they are active. The implicit method uses the "More Data" flag specified in the IEEE 802.11 standard: the sender notifies a receiver to switch to an inactive state by clearing the "More Data" flag. As a measure of fail-safe, the sender records the addresses of active receivers in BRTS frames in a round robin manner. The sender also informs the number of active stations to receivers using the Num field.

Figure 4B:
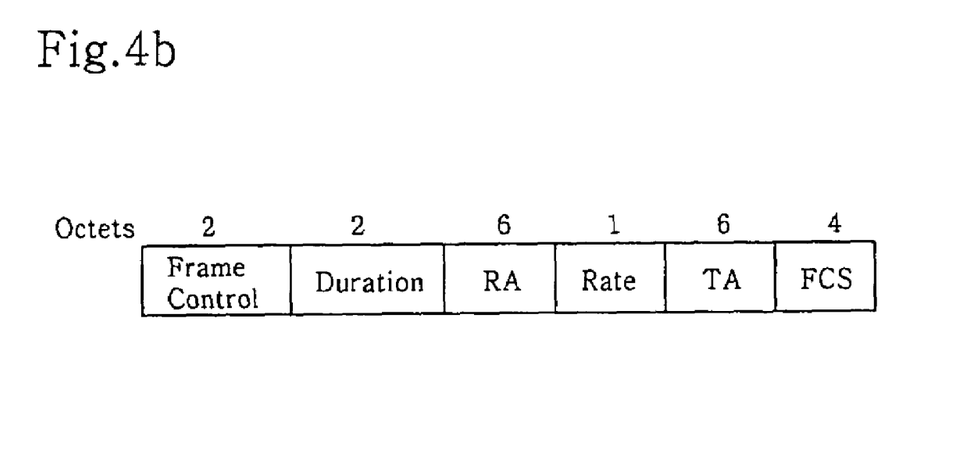

FIG. 4B illustrates the modified CTS frame. The CTS frame is augmented with two fields, R and TA; R (Rate) specifies the desirable data rate and TA (Transmitter Address) is the receiver's MAC address.

To perform the channel-dependent backoff mechanism, each receiver must estimate the p.d.f. of its received signal strength. Rayleigh or Ricean distributions are commonly used to model the statistical time varying nature of the received envelop of a fading signal. When channels has Rayleigh fading, the received signal strength follows an exponential distribution. Because the shape of exponential distributions is determined by a single parameter, the average, we can easily estimate the p.d.f. by using a low pass filter with the time constant of 0.001.

Ricean fading is much more difficult to estimate than Rayleigh fading. Measurements of the peak amplitude of the dominant signal and the variances of multi-path signals require special hardware such as a vector network analyzer and it is impractical to equip that hardware in IEEE 802.11 WLAN adapters. Leaving off exact measurements, we approximate a channel quality p.d.f. of Ricean fading to an exponential distribution with the same average. This approximation may lower the performance of WDOS. The performance degradation depends on the Ricean factor, K, that decides the shape of distributions. Typical indoor wireless channels in 5 GHz unlicensed bands are modeled with Ricean factors ranging from 1.5 to 2.9. From computer simulation results, we confirm that the performance degradation due to approximation is not significant at typical indoor environments.

We need to modify the Network Allocation Vector (NAV) semantics and NAV setting mechanisms. The duration field in IEEE 802.11 WLAN frames (RTS, CTS, and DATA frames) specifies the time required to finish the remaining RTS-CTS-DATA-ACK exchange. In the normal RTS/CTS exchanges, these time durations can be easily calculated because the sender knows the data size and transmission rates. In WDOS, these two values are not determined yet when BRTS or CTS are transmitted. Because the IEEE 802.11 standard allows the duration specified in a RTS frames to be updated by a later DATA frame, we can modify the semantics of duration fields in BRTS frames rather easily. In the channel probing phase, we temporarily set the duration value of BRTS as $2*SIFS+T_{CTS}+B_{max}$ and specify the exact duration values in a later DATA frame when the target receiver is selected. The CTS frames require more careful treatments than the BRTS frames because the duration declared in the CTS frames may not be modified later. One approach is an inflate-deflate scheme; receivers announce the duration required for the transmission of an MTU sized frame and this temporary NAV values may be corrected through the subsequent DATA and ACK frames with an exact duration value. The inflate-deflate scheme, however, necessitates a change in the RTS/CTS NAV setting procedure.

We conducted analyses and ns-2 based simulations to evaluate the performance of WDOS. The target system is the IEEE 802.11a which supports eight data rates from 6 Mbps to 54 Mbps. Receiver sensitivities of 6 Mbps to 54 Mbps are set to −88 dBm, −87 dBm, −86 dBm, −84 dBm, −81 dBm, −77 dBm, −73 dBm, and −69 dBm, respectively. The transmission power is fixed to 800 mW as specified for a 5.725-5.825 GHz band in IEEE 802.11a. Reception signal strength fluctuates according to short-term fading. A carrier sensing range is set to twice that of the transmission range at 6 Mbps. We use min(L*M−1, 45)*SlotTime as a default value of $B_{max}$. The size of all data frames is fixed to 1500 bytes. Each simulation result is obtained from 20 repetitions, but we omit confidence intervals because they are insignificant.

We begin with the sensitivity analysis of a parameter L. Note that L balances the trade-off relation between collisions and responsiveness. For simplicity, we assume that all channels follow the Rayleigh fading model with the same average. We eliminate the effect of randomness by fixing M=1 in order to pinpoint the effect of L.

Figure 5:
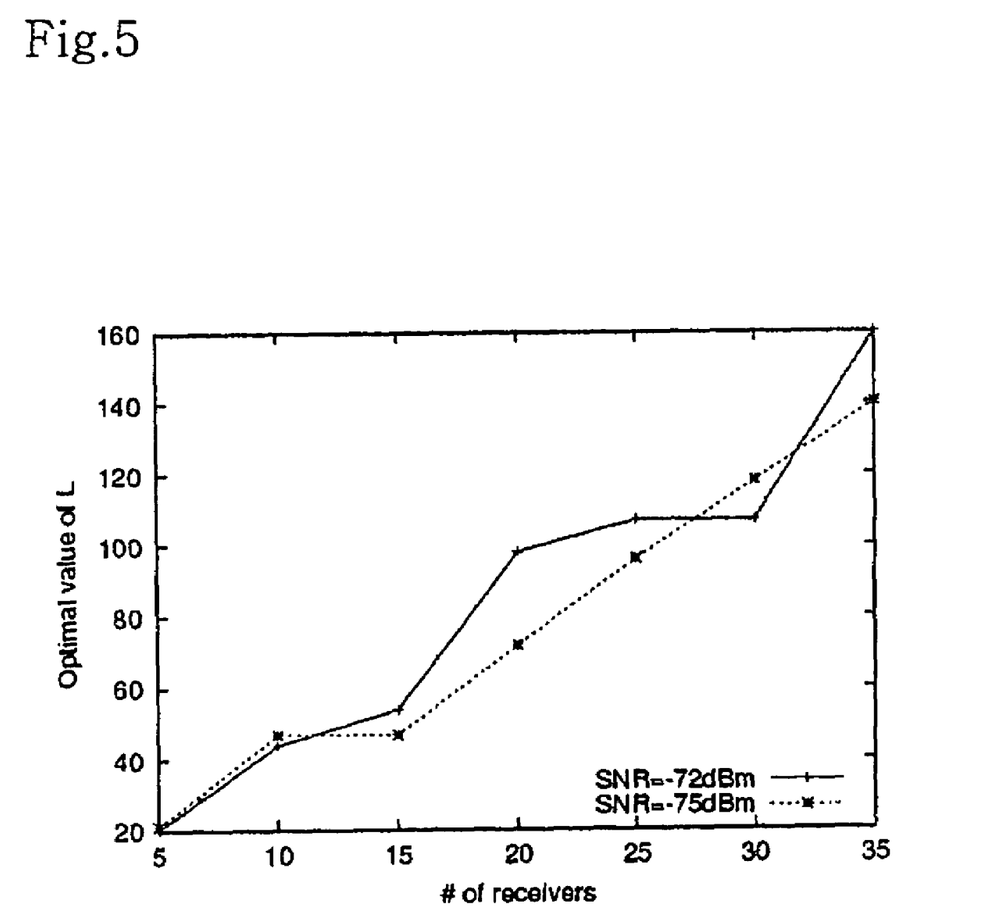
FIG. 5 is a graph indicating that an optimal value of L is linearly proportional to the number of active receivers, N, according to the present invention.

FIG. 5 shows the optimal values of L as a function of N, the number of active stations. The optimal L increases linearly as N increases, and we may represent $L_{opt}=c\cdot N$, where c is the slopes of the graphs in FIG. 5. We conclude from this result that three or four is an appropriate value of c.

Figure 6:
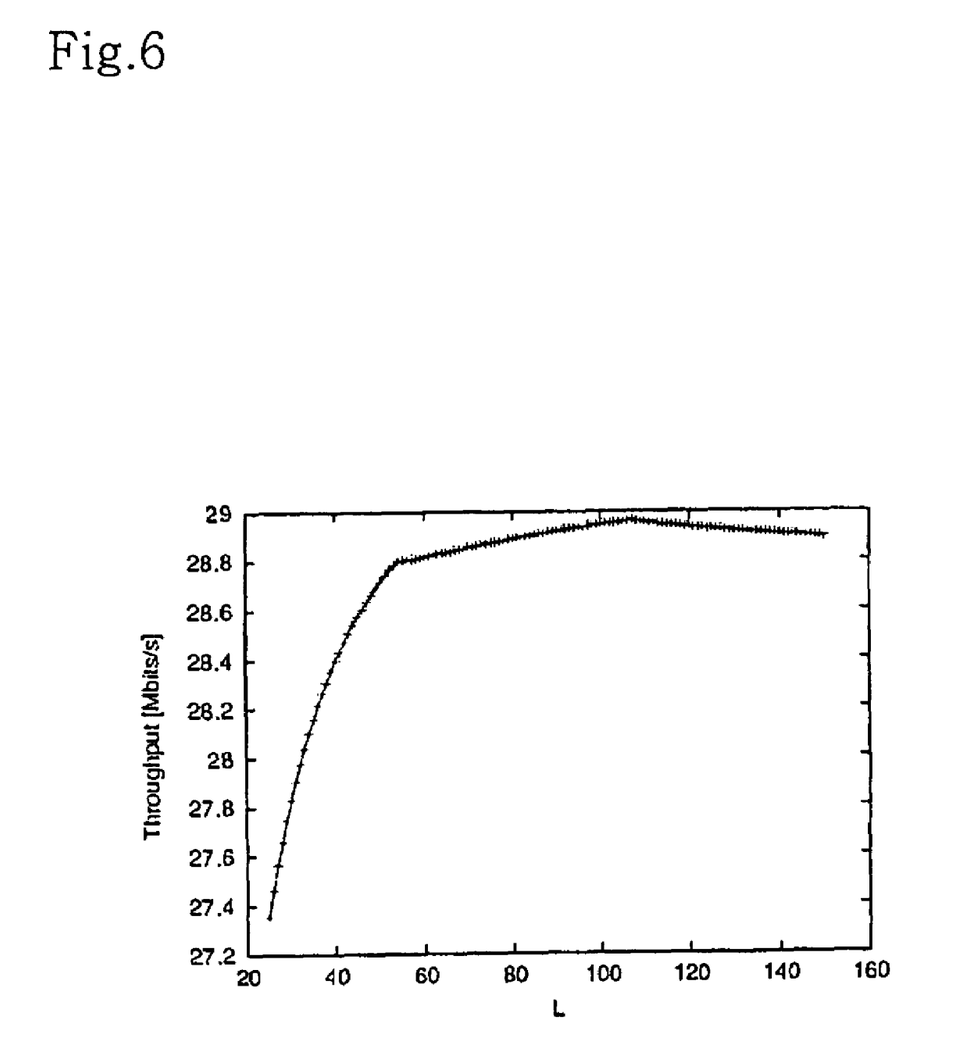
FIG. 6 is a graph illustrating a throughput as a function of L at a specific condition of N=25 and $\text{SNR}_{avg}$=−72 dBm according to the present invention.

FIG. 6 shows the throughput as a function of L for the case of N=25. The throughput increases sharply as L increases from 25 to 54. Beyond L=54, the throughput increases rather slowly and the peak performance is obtained at L=107. The throughput decreases slowly as the number of intervals increases beyond L=107. FIG. 6 indicates that the throughput is not sensitive to L when L ranges from 54 to 150. That is, if we let $L=c\cdot N$ and c ranges from 2 to 6, the performance of WDOS is not sensitive to the parameter c.

Figure 7:
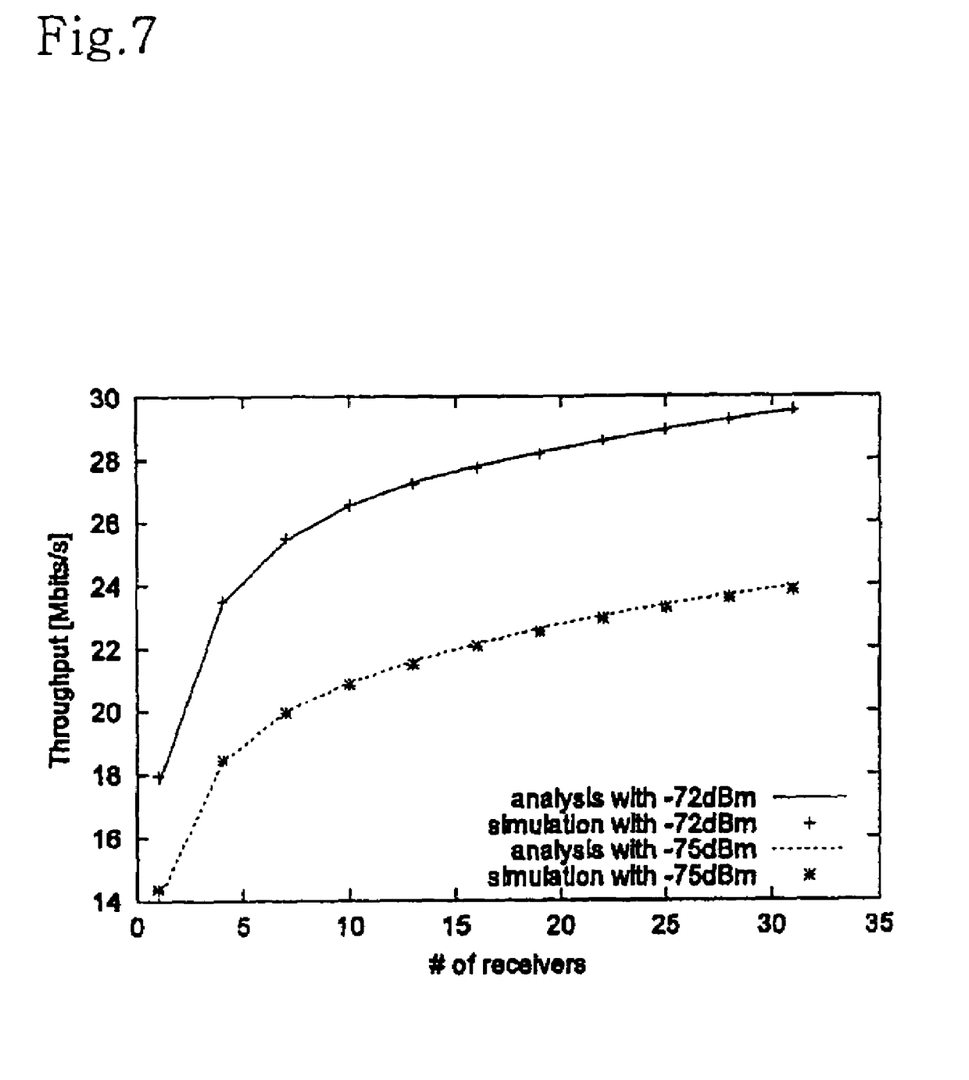
FIG. 7 is a graph illustrating a throughput acquired from analysis- and simulation-results associated with all the receivers having the same average channel quality −72 dBm or −75 dBm according to the present invention.

We validated the analytic model comparing its results with the simulation results. We fix c=4 and M=1. FIG. 7 shows the throughput as a function of N. We investigated the throughput at two different average SNRs, −72 dBm and −75 dBm. The results of analyses and simulations match well in all cases and we can conclude that the analytic model depicts the system accurately. We also observe that the multi-user diversity gains increase as the number of receivers increases in FIG. 7. Note that the 3 dB difference in average SNR does not make the 3 dB throughput difference because of Medium Access Control (MAC) and physical layer overheads.

Figure 8:
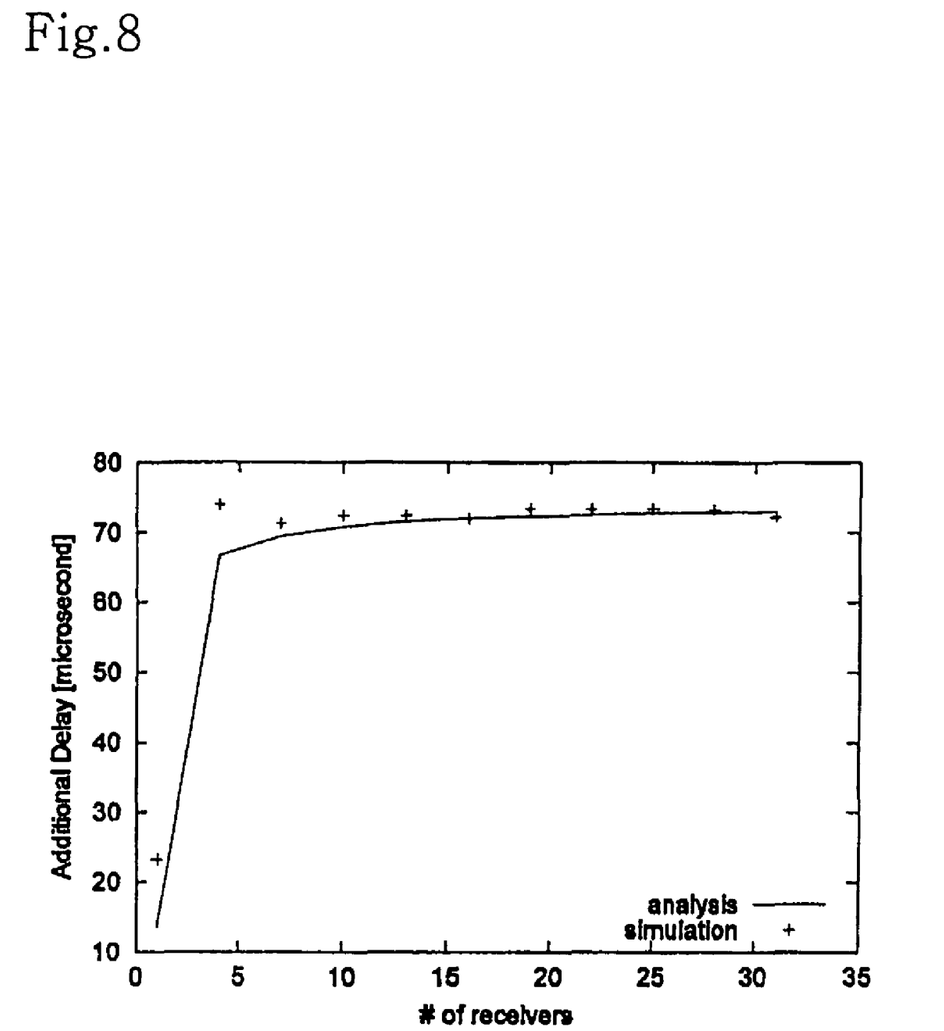
FIG. 8 is a graph illustrating an additional delay caused by a channel probing backoff when all the receivers have the same average channel quality of −72 dBm according to the present invention.

Next, to explain how WDOS fully exploits multi-user diversity with up to any number of receivers, we examine the channel probing overhead. FIG. 8 illustrates the average additional delay caused by channel probing as a function of N. The additional delay is the average channel acquisition delay minus the time for the basic RTS/CTS exchange. As shown in both the analysis and simulation results, the additional delay increases rapidly up to N=4, but becomes almost constant beyond N=4. Constant probing overheads help WDOS to achieve full multi-user diversity gains with any number of receivers.

We compared the performance of WDOS to those of MAD and OSMA via computer simulations. For proper comparisons, we tuned up the MAD and OSMA protocols. MAD selects candidate receivers for channel probing in a round-robin manner and chooses the final winner based on proportional fair (PF) scheduling. In OSMA, the threshold of each receiver is set to 70 percent of the average channel quality. The numbers of probed receivers in MAD and OSMA are set to three and four, respectively, because these values were shown to be optimal. We also include the performance of the max C/I scheduler as the theoretically maximum throughput. We assume that the max C/I scheduler knows the channel conditions of all receivers after one RTS/CTS exchange. We further assume that channels follow Rayleigh fading with a 1 Hz Doppler shift. To prevent consecutive CTS collisions at a long coherence time in WDOS, we fix M=2 and c=3.

Figure 9:
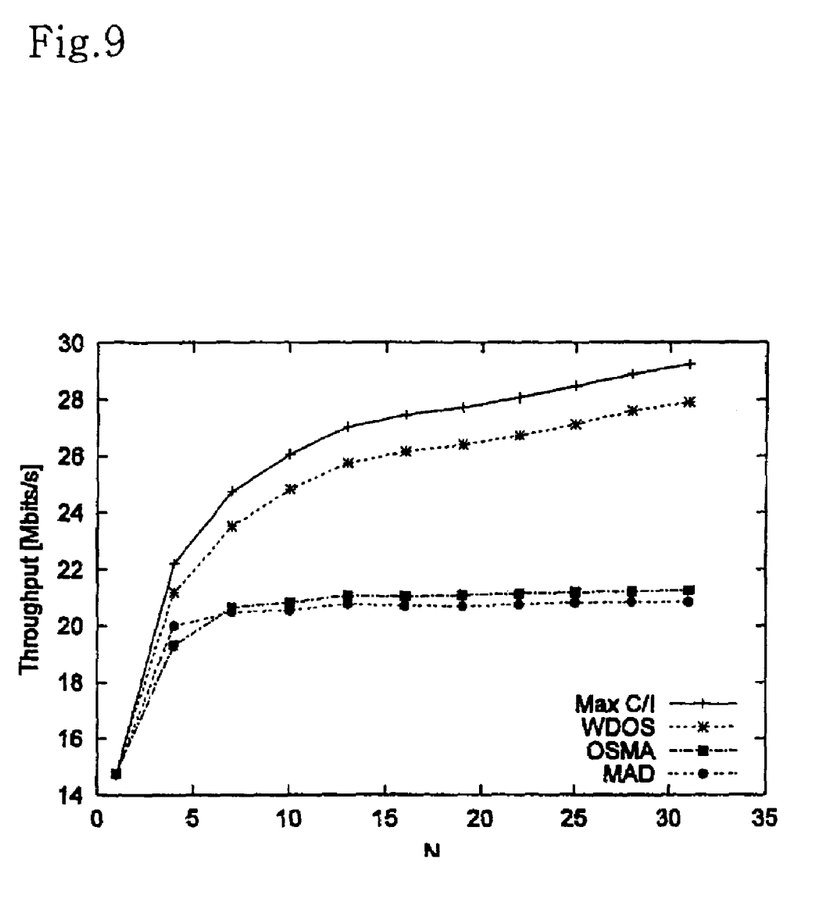
FIG. 9 is a graph illustrating the comparison result of throughputs of WDOS, MAD, OSMA, and the max C/I scheduler according to the present invention.

FIG. 9 shows the throughput of WDOS, MAD, OSMA, and the max C/I scheduler as a function of N. The throughput of all scheduling algorithms increases as N increases from 1 to 5. The throughput of WDOS and the max C/I scheduler increases further beyond N=5 as N increases. In contrast, MAD and OSMA reach their saturation point at around N=7. This result indicates that MAD and OSMA fail to fully utilize multi-user diversity gains. At N=30, the throughput of WDOS is about 25% higher than those of MAD or OSMA.

WDOS is designed to support temporal fairness. In order to evaluate temporal fairness of WDOS, we set up a heterogeneous network environment, where the average signal strengths ($SNR_{avg}$) of eight receivers are different as shown in Table 1. The transmitted signals suffer from Rayleigh fading with a 4 Hz Doppler shift.

TABLE 1

Average signal strengths with i.i.d. Rayleigh fading

| user index | $SNR_{avg}$ [dBm] | user index | $SNR_{avg}$ [dBm] |
|---|---|---|---|
| 1 | −82.02 | 5 | −78.06 |
| 2 | −81.01 | 6 | −77.01 |
| 3 | −80.07 | 7 | −75.92 |
| 4 | −79.09 | 8 | −74.91 |

Figure 10:
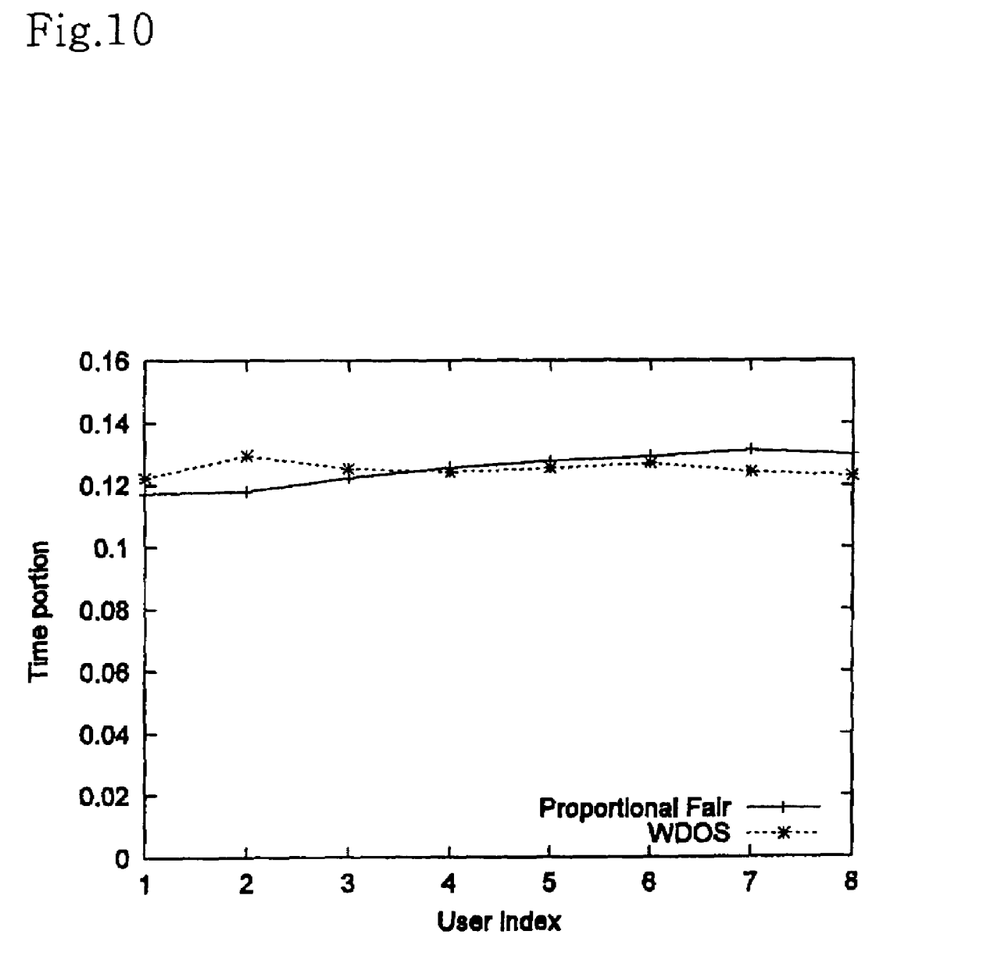
FIG. 10 is a graph illustrating temporal fairness of WDOS according to the present invention.

FIG. 10, which shows the percentages of time allocated to each receiver, compares the temporal fairness of WDOS and PF scheduling. We can observe that WDOS allocates the almost equal time-shares to each receiver even if average channel conditions are different. We may also conclude that even if WDOS is a distributed protocol, it provides temporal fairness comparable to PF scheduling.

As mentioned above, we approximate Ricean fading channels with an exponential distribution. Let us examine the effect of approximation on the WDOS performance. We assume that fading channels follow the Ricean distribution with K=3.

Figure 11:
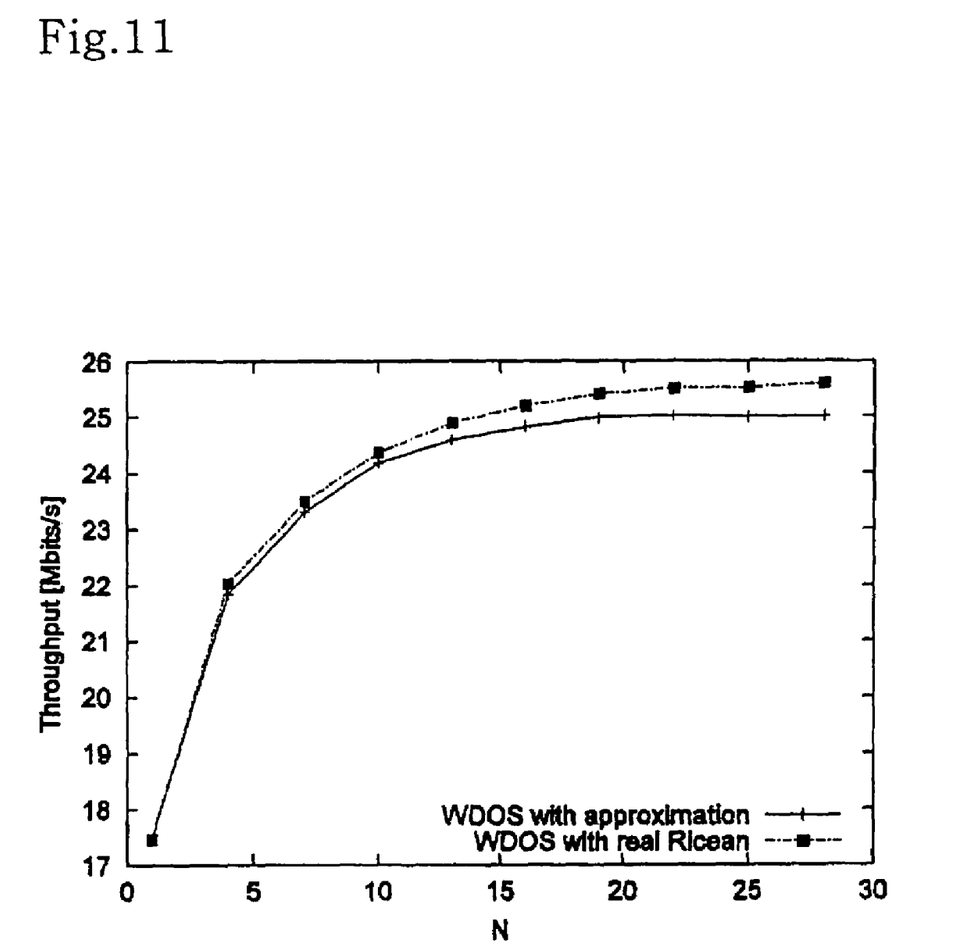
FIG. 11 is a graph illustrating the comparison result of a first throughput based on the Ricean distribution and a second throughput based on the Rayleigh approximation according to the present invention, so that the reception signal strength's distribution approximates with an exponential distribution during the channel's Ricean fading, resulting in the occurrence of different influences on a WDOS throughput.

FIG. 11 compares two throughput results, one based on the Ricean distribution and another based on the Rayleigh approximation. When N is small (N≦10), the Rayleigh approximation performs well without significant performance degradation. However, as N increases, performance gap also increases.

As apparent from the above description, the WLAN distributed/opportunistic scheduling (WDOS) method according to the present invention can effectively perform the channel probing without limiting the number of reception users (i.e., receivers) who desire to probe a channel condition, and can acquire a multi-user diversity.

The WDOS method according to the present invention maintains service fairness between users, and at the same time improves an overall channel throughput as compared to the conventional scheduling method.

The WDOS method according to the present invention is not affected by a routing method, differently from a general path diversity method, such that it can be independently implemented without depending on other techniques.

The WDOS method according to the present invention can implement an optimal channel probing performance even if the transmitter knows absolutely nothing about channel conditions of the receivers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distributed/opportunistic scheduling method for acquiring a multi-user diversity gain in a wireless local area network (WLAN) including a transmitter for transmitting data and a plurality of receivers for receiving the data from the transmitter comprising the steps of:
   a) broadcasting, by the transmitter, a BRTS (Broadcast Request-to-Send) frame to all the receivers, and informing the receivers of a channel probing intention;
   b) measuring, by the receivers having received the BRTS frame, instantaneous reception signal strengths, and acquiring a probability density function of the measured instantaneous reception signal strengths from the measured instantaneous reception signal strengths and their average value;
   c) dividing the probability density function into a predetermined number of intervals;
   d) determining which one of the divided intervals includes a current reception signal strength, and calculating a backoff period according to the position of the determined interval;
   e) transmitting a CTS (Clear-to-Send) frame after the backoff period expires; and
   f) transmitting, by the transmitter, data frames to a specific receiver having firstly transmitted the CTS frame.

2. The method according to claim 1, wherein the transmitter broadcasts a BRTS (Broadcast Request-to-Send) frame which includes two additional fields in a general RTS frame used for the WLAN, the two additional fields including:
   an Add/Drop (A/D) field for managing a set of active receivers acting as the receivers to which the transmitter has pending data frames to deliver; and
   a Num Field for indicating the number of the active receivers.

3. The method according to claim 2, wherein:
   if the transmitter has data frames to send to a currently dormant receiver, the transmitter sets the A/D flag to '1', records an MAC address of a newly-activated receiver in an RA field, broadcasts the BRTS frame, and thus indicates that the receiver becomes the active receiver; and
   if there is no packet to be transmitted to the active receiver, the transmitter sets the A/D flag to '0', records an MAC address of the corresponding receiver in the RA field, broadcasts the BRTS frame, indicates that the corresponding receiver is a passive receiver, and commands the receiver not to participate in a CTS (Clear-to-Send) competition.

4. The method according to claim 1, wherein:
   if the BRTS frame has no WDOS control field capable of managing a set of active receivers acting as the receivers to which the transmitter has pending data frames to deliver, the transmitter uses an RA field as a bitmap field, such that it simultaneously indicates states of all the receivers.

5. The method according to claim 1, wherein the receiver measures instantaneous reception signal strengths, and acquires a probability density function of the measured instantaneous reception signal strengths from the measured instantaneous reception signal strengths and their average value.

6. The method according to claim 5, wherein the receiver divides the probability density function into a predetermined number of intervals having the same area to assign the same probability to the intervals, selects a single interval of the highest signal strength from among the intervals, and displays the selected interval as a first interval.

7. The method according to claim 6, wherein the number of the divided intervals is linearly proportional to the number of active receivers acting as the receivers to which the transmitter has pending data frames to deliver.

8. The method according to claim 1, wherein the receiver, if the reception signal strength measured while receiving the BRTS frame belongs to an i-th interval of the probability density function, calculates the backoff period for transmitting the CTS frame using the following equation:

$$\text{Backoff}=((i-1)*M+rand[0,\ldots,M-1])*\text{SlotTime}. \quad \text{[Equation]}$$

where SlotTime is a slot time of the WLAN, M is a constant of at least 2 to prevent consecutive CTS collisions from being generated, and rand[0, ..., M−1] is a function for selecting an arbitrary single number from among a plurality of numbers contained in a specific interval [ ].

9. The method according to claim 1, wherein:
the receiver cancels the CTS frame if the backoff period is longer than a predetermined maximum backoff period (Bmax), or cancels the CTS frame if it receives the CTS frame from another receiver before the backoff period expires, and
the receiver records a maximum transfer rate at the BRTS reception signal strength in an R (Rate) field of the CTS frame, and transmits the CTS frame to the transmitter after the backoff period expires.

10. The method according to claim 1, wherein the transmitter transmits data frames to the receiver having firstly transmitted the CTS frame at a transfer rate recorded in an R (Rate) field of the CTS frame.

11. A distributed/opportunistic scheduling method for acquiring a multi-user diversity gain in a wireless local area network (WLAN) including a transmitter for transmitting data and a plurality of receivers for receiving the data from the transmitter comprising the steps of:
a) broadcasting, by the transmitter, a BRTS (Broadcast Request-to-Send) frame to all the receivers, and informing the receivers of a channel probing intention;
b) measuring, by the receivers having received the BRTS frame, instantaneous reception signal strengths, and calculating a probability density function of the measured instantaneous reception signal strengths as an exponential distribution which is a function of an average of the measured instantaneous reception signal strengths;
c) dividing the calculated exponential distribution function into a predetermined number of intervals;
d) determining which one of the divided intervals includes a current reception signal strength, and calculating a backoff period according to the position of the determined interval;
e) transmitting a CTS (Clear-to-Send) frame after the backoff period expires; and
f) transmitting, by the transmitter, data frames to a specific receiver having firstly transmitted the CTS frame.

12. The method according to claim 11, wherein the transmitter broadcasts a BRTS (Broadcast Request-to-Send) frame which includes two additional fields in a general RTS frame used for the WLAN, the two additional fields including:
an Add/Drop (A/D) field for managing a set of active receivers acting as the receivers to which the transmitter has pending data frames to deliver; and
a Num Field for indicating the number of the active receivers.

13. The method according to claim 12, wherein:
if the transmitter has data frames to send to a currently dormant receiver, the transmitter sets the A/D flag to '1', records an MAC address of a newly-activated receiver in an RA field of the BRTS frame, and thus indicates that the receiver becomes the active receiver; and
if there is no packet to be transmitted to the active receiver, the transmitter sets the A/D flag to '0', and indicates that the corresponding receiver is a passive receiver, and commands the receiver not to participate in a CTS (Clear-to-Send) competition.

14. The method according to claim 11, wherein:
if the BRTS frame has no WDOS control field capable of managing a set of active receivers acting as the receivers to which the transmitter has pending data frames to deliver, the transmitter uses an RA field as a bitmap field, such that it simultaneously indicates states of all the receivers.

15. The method according to claim 11, wherein the receiver receives the BRTS frame from the transmitter several times, estimates an average reception signal strength of the received BRTS frame, and calculates the reception signal strength's distribution as an exponential distribution which is a function of the estimated average reception signal strength.

16. The method according to claim 15, wherein the receiver divides the exponential distribution into a predetermined number of intervals having the same area to assign the same probability to the intervals, selects a single interval of the highest signal strength from among the intervals, and displays the selected interval as a first interval.

17. The method according to claim 16, wherein the number of the divided intervals is linearly proportional to the number of active receivers acting as the receivers to which the transmitter has pending data frames to deliver.

18. The method according to claim 11, wherein the receiver, if the reception signal strength measured while receiving the BRTS frame belongs to an i-th interval of the exponential distribution, calculates the backoff period for transmitting the CTS frame using the following equation:

$$\text{Backoff}=((i-1)*M+rand[0,\ldots,M-1])*\text{SlotTime}. \quad \text{[Equation]}$$

where SlotTime is a slot time of the WLAN, M is a constant of at least 2 to prevent consecutive CTS collisions from being generated, and rand[0, ..., M−1] is a function for selecting an arbitrary single number from among a plurality of numbers contained in a specific interval [ ].

19. The method according to claim 11, wherein:
the receiver cancels the CTS frame if the backoff period is longer than a predetermined maximum backoff period (Bmax), or cancels the CTS frame if it receives the CTS frame from another receiver before the backoff period expires, and
the receiver records a maximum transfer rate at the BRTS reception signal strength in an R (Rate) field of the CTS frame, and transmits the CTS frame to the transmitter after the backoff period expires.

20. The method according to claim 11, wherein the transmitter transmits data frames to the receiver having firstly transmitted the CTS frame at a transfer rate recorded in an R (Rate) field of the CTS frame.

* * * * *